Figure 1:
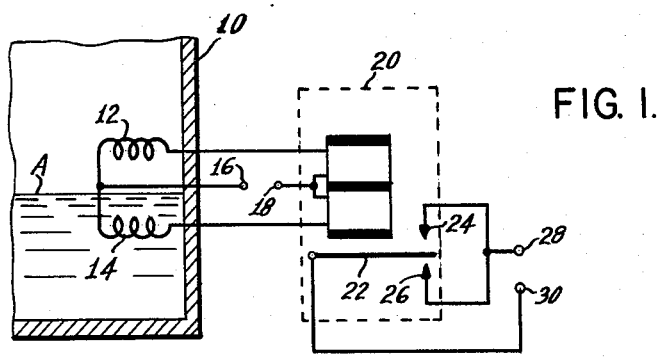

Aug. 25, 1964 A. R. BOBROWSKY 3,145,567
LIQUID LEVEL INDICATOR
Filed Nov. 17, 1958 2 Sheets-Sheet 1

INVENTOR.
ALFRED R. BOBROWSKY
BY Karl Haber
James E. Bryan
Alan C. Rose
ATTORNEYS.

Aug. 25, 1964   A. R. BOBROWSKY   3,145,567
LIQUID LEVEL INDICATOR
Filed Nov. 17, 1958   2 Sheets-Sheet 2

INVENTOR.
ALFRED R. BOBROWSKY
BY
ATTORNEYS.

3,145,567
LIQUID LEVEL INDICATOR
Alfred R. Bobrowsky, Florham Park, N.J., assignor to Nuclear Corporation of America, New York, N.Y., a corporation of Delaware
Filed Nov. 17, 1958, Ser. No. 774,391
8 Claims. (Cl. 73—295)

This invention relates to liquid level indicators and, more particularly, is concerned with liquid level indicators in which there are no moving parts and the monitoring of the level occurs at a location remote from the vessel containing the liquid.

There is a need for systems which meet the above mentioned requirements, especially in cases where the surrounding area, i.e. the liquid contained in the vessel or both, are contaminated by radioactivity. Whereas liquid level indicators used heretofore generally operate by means of a float on the liquid surface to indicate the level of the liquid in a tank, this invention provides a device and a method for monitoring the level to be indicated solely by electrical means which comprise no moving parts at all, whereby the recording and/or indicating means, of any conventional type, are remotely located from the tank at any desired distance.

This is achieved in accordance with the invention by mounting an electrical conductor in a zone in which a liquid level is to be indicated and registering a change in resistance value in the conductor as a result of a change of temperature therein. Based on this fundamental principle of utilizing the change in electrical resistance due to a change in temperature, when the conductor is immersed in the liquid as compared to its resistance when in contact with the atmosphere above the liquid, numerous modifications of the invention have been developed.

In connection with the boilers having an atmosphere of pressurized vapor above the water, which atmosphere is at the same temperature as the water, the invention provides a method permitting the creation of a temperature gradient in a continuous wire across the water level by heating the conductor to at least the boiling temperature of the water under pressure. Thereby, the water surrounding the conductor will attain its boiling point and the heat necessary for its conversion into vapor is supplied from the conductor, causing the temperature thereof to decrease. Since the determination of the resistance value is effected by registering the change in current in the conductor, the same current through the conductor serves the purpose of heating the conductor and of monitoring the change in resistance value.

A plurality of conducting elements, preferably wires or sections of one wire, hereinafter referred to as sensing wires and having the function described above, are mounted at different levels in the boiler, the number thereof depending on the required sensitivity of the system. This can be accomplished by mounting the sensing wires in the shape of individual probes at different levels, or else one single conductor may be used which intersects all the levels to be indicated, and which is mounted vertically in the tank. Such a conductor is divided into equal sections, each section being limited by taps formed by the connecting points of lead-in wires and having the function of one sensing wire as described above.

Whereas the registering of the resistance value of each such sensing wire can be effected as an absolute measurement, as compared to any value considered as the reference value, the invention provides a method and a system in which, for indicating a liquid level, comparison is made automatically between the resistance of the sensing wire above the level and that of the adjacent sensing wire below the level. This is accomplished by registering the resistance values of each pair of adjacent sensing wires of the system and monitoring the only pair having values which differ from each other. Whereas all pairs of sensing wires, which may be individual probes or tapped sections of one conductor, have the same resistance when both parts are either entirely immersed or entirely in the atmosphere above the level, the two sensing wires of the one pair separated by the liquid level have resistances differing from each other and this condition is used to indicate the level, as described hereinafter.

Figure 2:
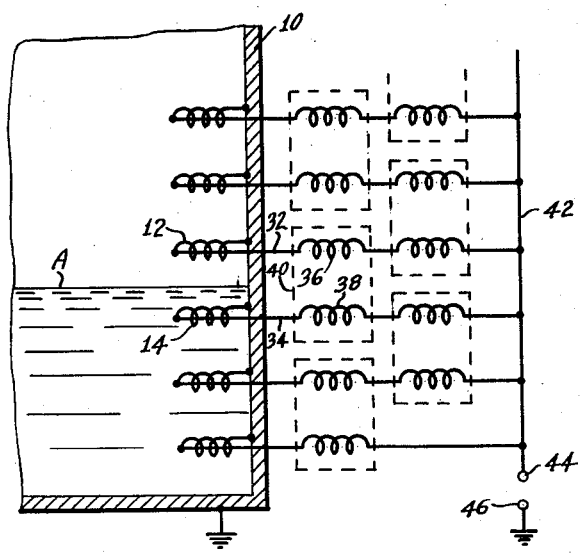
Figure 3:
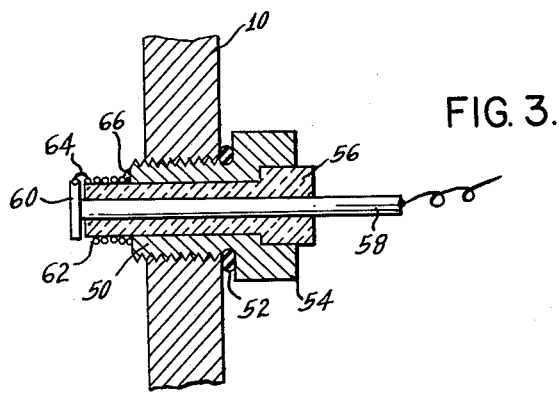
Figure 4:
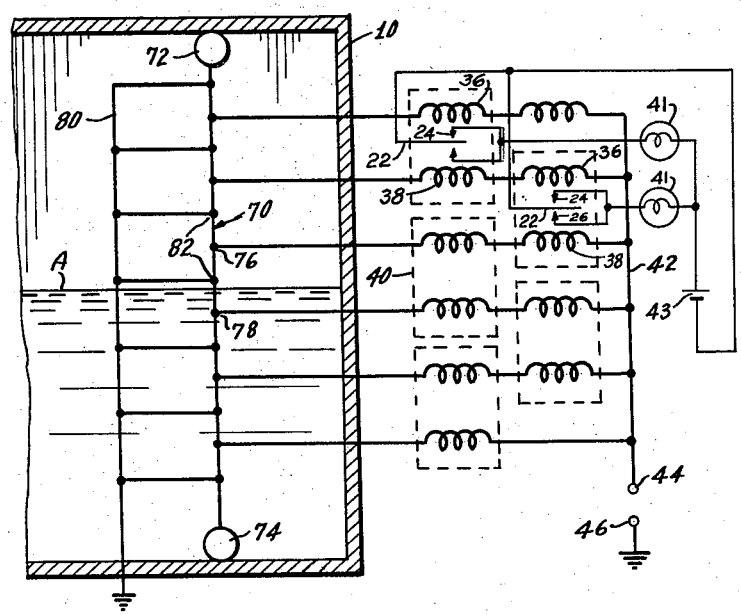
Figure 5:
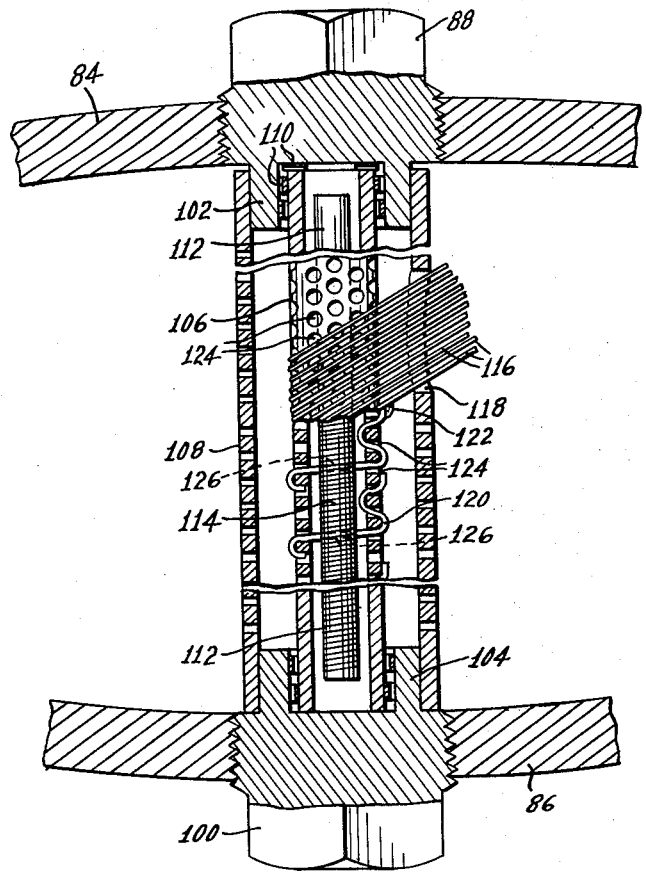

The invention will be further illustrated by reference to the accompanying drawing in which FIGURE 1 is a schematic diagram of a single indicator element, FIGURE 2 is a schematic diagram of an indicator comprising a plurality of probes, FIGURE 3 is a sectional view of one of the probes of FIGURE 2, FIGURE 4 is a schematic diagram of an indicator having one sensing wire extending through a tank, and FIGURE 5 is a fragmentary, longitudinal section through one embodiment of the single conductor indicator of FIGURE 4.

Referring to FIGURE 1, the principle of the invention as applied in a compensation method is illustrated in connection with a water boiler by the schematic diagram of a single indicator element which may be used for monitoring the attainment of one predetermined level. Within the boiler 10, a pair of sensing wires suitably in the shape of the coils 12 and 14 and preferably made from platinum, rhodium or platinum-clad wires are mounted adjacent each other and are separated by the level to be indicated. It will readily be appreciated from the description advanced hereinbelow that each of the sensing wires or coils 12 and 14 comprises a resistive element. Energized by the same current source connected at the terminals 16 and 18, each of the coils 12 and 14 forms one circuit including one of the coils of a differential relay 20. When both coils 12 and 14 are at the same temperature, which is the case when they are either both immersed in the water or when they are both in the atmosphere above the water, the effects of the current compensate each other and the armature 22 of the relay 20 remains in its de-energized position. The attainment of the level A by the liquid in the zone between the coils 12 and 14 will cause a temperature difference between them, which in turn results in a difference of current strength in the relay coils, and the armature 22 will operate to close a circuit through one of the contact points 24 or 26. Since monitoring the closing of the circuit by conventional optical, acoustical or any other desired remotely located means does not form part of this invention, the corresponding circuit elements to be connected to the terminals 28 and 30 have been omitted in the drawing. As noted above, in cases of water boilers having a pressurized atmosphere above the water level and in thermal equilibrium therewith, the current applied to the terminals 16 and 18 must be sufficiently strong to cause a temperature increase of the coils 12 and 14 to at least the boiling point of the water under the prevailing conditions. The heat loss from the coil 14 during boiling being much larger than that from the coil 12 in water vapor, a temperature and current difference will result therefrom which is monitored by means of the relay and the remotely located indicator.

A system using a plurality of sensing wires, each co-operating in the fashion described above with each adjacent wire, is shown in FIGURE 2. A desired number of individual probes in the shape of wire coils are mounted in the tank along the wall 10 thereof. Considering one pair of such probes, for example the coils 12 and 14, each coil has one end grounded to the tank wall 10 whereas the other end is connected by lead-in wires 32 and 34, respectively, to the two coils 36 and 38 of a differential relay 40; therefore each relay has its coils connected into the circuit of a pair of adjacent probes. The circuits are closed over a common conductor 42 and energized by a current source connected to the terminals 44 and 46. In operation, assuming that the water level A rises to separate the probe coils 12 and 14, the relay 40 will operate to close a circuit monitoring the position of the level, as described in connection with FIGURE 1.

Each of the relays responds in a similar fashion to a temperature change in one of the probes connected therto. For simplification and since any desired conventional method for indicating may be used, the corresponding components have been omitted from the drawing. A variable resistance may be incorporated in the circuit of each probe for adjustment of the resistance of the entire circuit to equality with other circuits or to a desired value.

FIGURE 3 illustrates one of the probes of FIGURE 2 in a sectional view. The probe consists essentially of an annular plug 50 threadably secured into a bore in the tank wall 10, whereby a tight seal is obtained by the compression of a gasket 52 mounted between the head 54 of the plug 50 and the wall. A ceramic insulator 56 is sealed into the bore of the plug, carrying in turn a lead-in conductor 58 in its axial bore, being sealed thereto and terminating in a circular disc 60. The sensing wire 62 is wound helically around the portion of the insulator 56 which protrudes into the tank, one end thereof being connected to the disc 60 the other end being grounded to the plug 50, as indicated at 64 and 66, respectively.

The embodiment of a liquid level indicator illustrated in FIGURE 4 makes use of one single sensing wire 70 mounted in the tank 10. When using a straight wire, the wire is suitably extended vertically in the tank between the insulators 72 and 74. In order to increase the sensitivity of the wire, it can be helically wound around a support as set forth hereinafter in connection with FIGURE 5. The straight wire 70 in FIGURE 4 is divided into sections by a plurality of taps formed by lead-in wires connected thereto, the lead-in wires inserting the relay coils into their respective circuits such that each section performs in a fashion identical with that of the probes described in connection with FIGURE 2. Each of the divided sections of the wire 70 comprises a resistive element. Selecting one of the sections for the purpose of reference, it is assumed that the water level A in the boiler attains the zone between the taps 76 and 78. Energized by the current source connected at the terminals 44 and 46, through the common line 42, over the corresponding sections of the wire 70 and a second common line 80 connected by additional taps 82 to each section and which may be the mass of the tank 10 itself, all pairs of relay coils will carry a current of identical strength, with the exception of the coils of the relay 40 which, therefore, will respond and close the circuit to energize the monitoring signal. By way of example, there are shown in FIGURE 4 two typical signal circuits associated with the two uppermost differential relays 40 in the drawing. As has been explained hereinabove in connection with FIGURES 1 and 2, each relay 40 includes two windings 36 and 38. When both windings carry the same current, the armature 22 of the relay is in a neutral position. When a difference in current exists, armature 22 engages one of the contacts 24 or 26. When this occurs, a signal is produced by any suitable means. For example, it could complete the circuit of a battery 43 to a lamp 41. Any other suitable indicating means can of course be employed. It will readily be appreciated that all of the other relays 40 shown in FIGURE 4 have similar signaling circuits associated therewith. Furthermore, in this embodiment, when applying it to boilers having a pressurized atmosphere above the boiling liquid, the temperature gradient is produced by using a sufficiently strong current source connected to the terminals 44 and 46 to locally heat the liquid adjacent to the sensing wire 70 to the boiling temperature thereof.

In order to obtain a sensitive indicator capable of monitoring a change of the level within a small range, it has been found advantageous to use a sensing wire helically wound around an insulating support and a more detailed, fragmentary sectional view of a sensing device of this type is shown in FIG. 5. The top 84 and the bottom 86 of the tank are provided with tapped bores to receive threaded plugs 88 and 100, respectively, having annular portions 102 and 104 thereon protruding into the tank and facing each other. Each plug has a cylindrical recess which receives one end of a perforated, e.g. ceramic, tube 106 which has the primary function of a wave-breaking housing or baffle to minimize splash on the device contained therein. An additional similar perforated tube 108 is shown in FIG. 5 maintained in position by encompassing the protruding plug portions 102 and 104. The perforated tube 106 is mounted with small clearances in the plug recesses and is centered therein by means of the wave springs or equivalent means 110 to permit thermal expansion of both components.

A tube or rod 112, made suitably from aluminum oxide or from procelainized and mounted in the baffle tube 106, serves as a support for the sensing wire 114. The conductor forming the sensing wire is a platinum, rhodium, or platinum-clad wire which is wound helically around the tube 112 and bonded thereto at locations spaced from each other. By using two sensing wires 114 instead of one, a margin of safety and warning is obtained in case one of them breaks.

In order to connect distinct sections of the sensing wire 114 into the relay circuits of FIGURE 4, the required number of lead-in wires is passed through an opening 118 in the outer baffle 108 and wound helically around the inner baffle 106. Adjacent the connecting point with the wire 114, each of the lead-in wires 116 is welded to a short, heavy wire 120, as indicated at 122; each of the heavy wires 120 is conducted through several of the perforations in the tube 106, as shown at 124, for the purpose of fastening it thereto and is passed through a bore 126 in the support 112. The protruding ends, after again passing through several of the bores in the inner baffle 106 are welded to the wire 114 to form the taps therefrom. It will be apparent that the heavy wires serve two purposes: they constitute the connecting elements between the lead-in wires 116 and the sensing wire 114 and, at the same time, they maintain the support 112 freely suspended in the center of the perforated baffle housing 106 to permit thermal expansion thereof. However, any other adequate means for suspending the support 112 can be employed.

Whereas the invention has been illustrated herein in connection with one or more differential relays, the change in resistance can be monitored by means of any other equivalent device, such as a magnetic amplifier.

It will be obvious to those skilled in the art that many modifications may be made within the scope of the present invention without departing from the spirit thereof, and the invention includes all such modifications.

What is claimed is:

1. Apparatus for detecting the level of liquid in a tank including in combination a plurality of resistive elements disposed at successive levels within said tank, each of said elements shaving a first resistance value when immersed in the liquid in said tank and a second resistance value when out of the liquid in the tank, a plurality of differential relays each comprising a pair of windings, means connecting each resistive element in a circuit with a winding of each of a pair of said differential relays to form a plurality of circuits, a source of voltage and means for applying said voltage across each of said circuits.

2. Apparatus for detecting the level of liquid in a tank including in combination a plurality of resistive elements, means mounting said elements at various levels in said tank, a plurality of differential relays each comprising a first winding and a second winding and adapted to operate in response to a predetermined current difference in said windings, means connecting one of said resistance elements in a circuit with the first winding of one of said relays and the second winding of another of said relays, means connecting a second resistive element in a circuit with the second winding of a third relay and the first winding of said other relay and means for energizing said circuits.

3. Apparatus for detecting the level of liquid in a tank including in combination a conductor extending generally upwardly in said tank, a plurality of taps connected to said conductor at points within said tank intermediate the ends of said conductor to divide the conductor into a plurality of resistive element sand means connected to said taps for indicating a change in the relative resistance values of a pair of adjacent resistive element to indicate the level of said liquid.

4. Apparatus for detecting the level of liquid in a tank including in combination a support extending generally upwardly in said tank, a conductor helically wound around said support, a plurality of taps connected to said conductor at spaced points within said tank intermediate the length of said support to divide said conductor into a plurality of resistive elements and means connected to said taps for producing a signal in response to a change in the relative resistance of a pair of adjacent resistive elements to indicate the level of said liquid.

5. Apparatus for detecting the level of liquid in a tank including in combination a support extending generally upwardly in said tank, a conductor helicaly wound around said support, a plurality of taps connected to said conductor at spaced points within said tank intermediate the length of said support to divide said conductor into a plurality of resistive elements, means connected to said taps for producing a signal in response to a change in the relative resistance of a pair of adjacent resistive elements to indicate the level of said liquid, a baffle adapted to house said support and means for suspending said support within said baffle.

6. Apparatus for detecting the level of liquid in a tank including in combination a support extending generally upwardly in said tank, a conductor helically wound around said support, a plurality of taps connected to said conductor at spaced points within said tank intermediate the length of said support to divide said conductor into a plurality of resistive elements, means connected to said taps for producing a signal in response to a change in the relative resistance of a pair of adjacent resistive elements to indicate the level of said liquid, a baffle adapted to house said support, said taps comprising lead wires connected to said conductor and means forming openings in said baffle through which said lead wires extend.

7. In apparatus for detecting the level of liquid in a tank a pair of resistive elements, each of said elements having a first resistance value when immersed in the liquid in said tank and a second resistance value when out of the liquid in the tank, means mounting said elements in said tank in vertically spaced relationship at successive levels in said tank, three differential relays each having a first and a second winding, means connecting one of said resistive elements in a circuit with the first winding of one of said relays and the one winding of a second one of said relays and means connecting the other resistive element in a circuit with the second winding of the first relay and a winding of the third relay.

8. Apparatus for determining the level of liquid in a tank including in combination a support, a helical winding carried by said support, means positioning said support in said tank with the winding axis extending generally in a vertical direction, a perforated baffle surrounding said winding, a plurality of lead-in wires extending through the perforations in said baffle and connected to said winding at spaced points therealong to define a plurality of resistive elements and means for detecting a change in relative resistance of a pair of successive resistance elements to indicate the level of said liquid.

References Cited in the file of this patent
UNITED STATES PATENTS

| 2,211,606 | Pratt | Aug. 13, 1940 |
| 2,456,617 | Burch | Dec. 21, 1948 |
| 2,667,178 | Fred et al. | Jan. 26, 1954 |
| 2,694,930 | Lamb et al. | Nov. 23, 1954 |
| 2,766,406 | Schwarzkopf | Oct. 9, 1956 |
| 2,894,390 | Talbot | July 14, 1959 |

FOREIGN PATENTS

| 555,939 | Germany | Aug. 1, 1932 |
| 318,219 | Switzerland | Feb. 15, 1957 |

OTHER REFERENCES

"The Review of Scientific Instruments," vol. 27, No. 12, December 1956. Article Title, "Hot Wire Liquid-Level Indicator," pages 1024–1027; only pages 1024 and 1025 are required.